(12) United States Patent
Lee et al.

(10) Patent No.: US 10,853,503 B2
(45) Date of Patent: Dec. 1, 2020

(54) SELECTIVE ENCODING METHOD AND ELECTRONIC DEVICE USING SAME

(71) Applicant: Samsung Electronics Co., Ltd, Suwon-si (KR)

(72) Inventors: Woo-Joong Lee, Suwon-si (KR); Yeong-Jin Gil, Suwon-si (KR); Sung-Hwan Yun, Suwon-si (KR); Ki-Tae Lee, Suwon-si (KR); Dae-Ho Jeong, Hwaseong-si (KR); Min-Jung Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 15/769,666

(22) PCT Filed: Oct. 18, 2016

(86) PCT No.: PCT/KR2016/011693
§ 371 (c)(1),
(2) Date: Apr. 19, 2018

(87) PCT Pub. No.: WO2017/069489
PCT Pub. Date: Apr. 27, 2017

(65) Prior Publication Data
US 2018/0307847 A1 Oct. 25, 2018

(30) Foreign Application Priority Data
Oct. 19, 2015 (KR) .................. 10-2015-0145453

(51) Int. Cl.
*H04L 29/06* (2006.01)
*G06F 21/60* (2013.01)
(Continued)

(52) U.S. Cl.
CPC ............ *G06F 21/602* (2013.01); *G06F 21/78* (2013.01); *H04L 9/06* (2013.01); *H04L 9/0863* (2013.01);
(Continued)

(58) Field of Classification Search
CPC ..................................................... G06F 21/602
See application file for complete search history.

(56) References Cited

U.S. PATENT DOCUMENTS

| 6,496,847 | B1 * | 12/2002 | Bugnion | G06F 9/45533 703/21 |
| 6,961,941 | B1 * | 11/2005 | Nelson | G06F 9/45533 719/310 |

(Continued)

OTHER PUBLICATIONS

International Search Report dated Jan. 9, 2017 in connection with International Patent Application No. PCT/KR2016/011693.
(Continued)

*Primary Examiner* — Shawnchoy Rahman

(57) ABSTRACT

An operation method for an electronic device is disclosed. The operation method for an electronic device according to an embodiment may comprise the steps of: configuring a block layer for virtualizing a storage on a volatile memory as a block device; storing a file in the configured block layer in units of blocks; selectively encoding, in a unit of at least one block, the file which has been stored in units of blocks; and storing at least one of an encoded block and a non-encoded block in the storage.

12 Claims, 10 Drawing Sheets

(51) Int. Cl.
  H04L 9/06   (2006.01)
  G06F 21/78  (2013.01)
  H04L 9/08   (2006.01)

(52) U.S. Cl.
  CPC .... H04L 9/0894 (2013.01); *G06F 2221/2107* (2013.01); *H04L 2209/805* (2013.01); *H04L 2209/88* (2013.01)

(56) References Cited

U.S. PATENT DOCUMENTS

| | | |
|---|---|---|
| 8,190,850 B1 | 5/2012 | Davenport et al. |
| 8,798,262 B1 | 8/2014 | Raizen et al. |
| 9,563,785 B2 * | 2/2017 | Ryan ................. G06F 17/00 |
| 2005/0080761 A1 * | 4/2005 | Sundararajan .......... G06F 21/85 |
| 2007/0083467 A1 * | 4/2007 | Lindahl ............... H04N 21/835 |
| | | 705/50 |
| 2008/0320316 A1 | 12/2008 | Waldspurger et al. |
| 2013/0232329 A1 * | 9/2013 | Marinelli ............ G06F 12/1408 |
| | | 713/2 |
| 2013/0294599 A1 | 11/2013 | Chen et al. |
| 2014/0164792 A1 | 6/2014 | Nord et al. |
| 2014/0380035 A1 | 12/2014 | Marinelli et al. |
| 2016/0162699 A1 * | 6/2016 | Ryan .................. G06F 21/6218 |
| | | 713/165 |

OTHER PUBLICATIONS

Written Opinion of the International Searching Authority dated Jan. 9, 2017 in connection with International Patent Application No. PCT/KR2016/011693.

* cited by examiner

SELECTIVE ENCODING METHOD AND ELECTRONIC DEVICE USING SAME

CROSS-REFERENCE TO RELATED APPLICATIONS AND CLAIM OF PRIORITY

This application is a 371 of PCT/KR2016/011693 filed on Oct. 18, 2016, which claims priority to Korean Patent Application No. 10-2015-0145453 filed on Oct. 19, 2015 in the Korean Intellectual Property Office, the disclosures of which are herein incorporated by reference in their entirety.

TECHNICAL FIELD

Various embodiments of the present disclosure relate to an electronic device and an operation method thereof, for example, an electronic device and an operation method thereof, in which a block corresponding to a file stored in a storage is selectively encrypted.

BACKGROUND

An electronic device configures a file in, reads the file from, and writes the file on a memory through a file system of an operating system.

As a data security issue becomes important, an encryption function of encrypting data of a file stored in various forms of memories or storages has been provided.

To encrypt a storage such as a disc device, a disc encryption method for encrypting the entire disc device may be used, in which after the disc device is physically removed from the electronic device or when the operating system is deactivated, data stored in the disc device may be protected, providing superior security performance.

Since the disc encryption method inputs or outputs data to or from the disc device on a block-by-block basis, the disc encryption method is also referred to as block device encryption.

SUMMARY

As general block device encryption encrypts the entire disc device that is an encryption-target block device, even data for error analysis is encrypted, such that an error of a file system, caused by instability of the block device or a system including the block device is difficult to analyze.

Moreover, general block device encryption may have inefficient encryption or decryption because of encrypting all blocks stored in the block device that is the encryption target.

In various embodiments of the present disclosure, a block is selectively encrypted such that a block for analyzing an error of a file system may not be encrypted.

Moreover, in various embodiments of the present disclosure, data to be encrypted among a plurality of data is determined based on various criteria, and block encryption is performed based on a determination result.

Furthermore, in various embodiments of the present disclosure, an operation associated with encryption of a block device may be efficiently performed.

According to various embodiments of the present disclosure, an electronic device include a non-volatile storage, a volatile memory, and a processor electrically connected with the storage and the memory, in which the storage stores instructions for causing, when executed, the processor to configure a block layer for virtualizing the storage on the memory, to store a file in the configured block layer in a unit of a block, to selectively encrypt at least a part of the file, stored in the unit of the block, in a unit of at least one block, and avoid encrypting the remaining part of the file, and to store at least one of the encrypted block or the non-encrypted block in the storage.

According to various embodiments of the present disclosure, an electronic device includes a non-volatile storage, a volatile memory, and a processor electrically connected with the storage and the memory, in which the storage stores instructions for causing, when executed, the processor to virtualize the storage as a block device on the memory, to selectively encrypt at least one block corresponding to a file stored in the virtualized storage, and to avoid encrypting an input or an output generated by driving of a file system utility.

According to various embodiments of the present disclosure, an electronic device includes a non-volatile storage, a volatile memory, and a processor electrically connected with the storage and the memory, in which the storage stores instructions for causing, when executed, the processor to virtualize the storage as a block device on the memory, to selectively encrypt at least one block corresponding to a file stored in the virtualized storage, and to avoid encrypting an input or an output generated by driving of a file system utility.

According to various embodiments of the present disclosure, an operation method of an electronic device including a non-volatile storage and a volatile memory includes configuring a block layer for virtualizing the storage as a block device on the memory, storing a file in the configured block layer in a unit of a block, selectively encrypting the file, stored in the unit of the block, in the unit of at least one block, and storing at least one of the encrypted block or a non-encrypted block in the storage.

According to various embodiments of the present disclosure, an electronic device and an operation method thereof are provided in which a block may be selectively encrypted. To this end, the electronic device according to various embodiments of the present disclosure determines an encryption-target block among a plurality of blocks stored in a disc device, and encrypts data of only a block corresponding to data that needs to be encrypted. Moreover, the present disclosure does not encrypt a block corresponding to data for correcting an error, thereby easily modifying the error when the error occurs. Furthermore, the present disclosure may encrypt a block corresponding to data that needs to be encrypted, thus providing a high security level.

DETAILED DESCRIPTION

Figure 1:
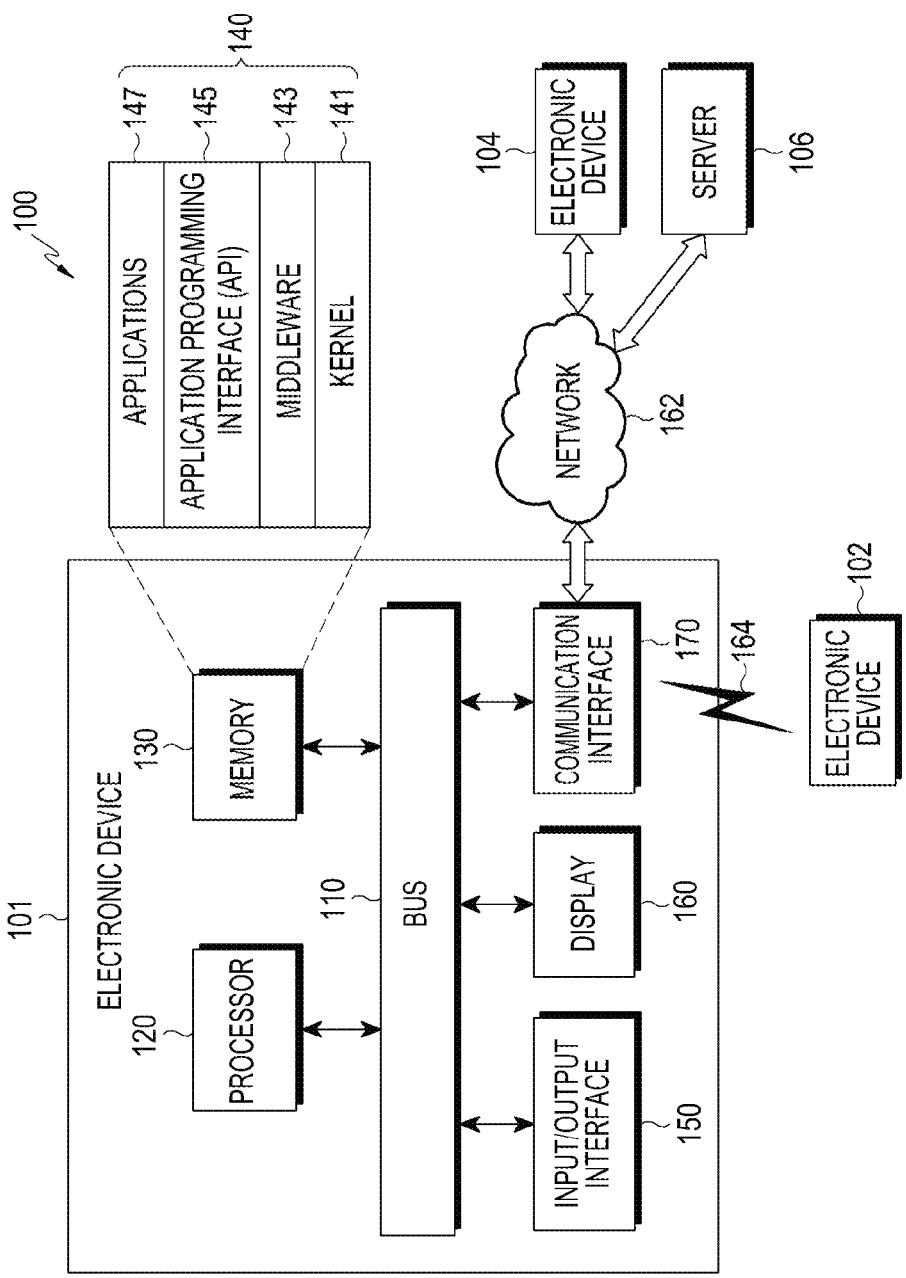
FIG. 1 is a block diagram of an electronic device and a network according to various embodiments of the present disclosure.

Hereinafter, various embodiments of the present disclosure will be disclosed with reference to the accompanying drawings. However, it should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

As used herein, each of such phrases as "A or B," "at least one of A or/and B," "at least one or more of A or/and B," and so forth may include all possible combinations of the items enumerated together in a corresponding one of the phrases. For example, "A or B," "at least one of A and B," or "one or more of A or B" may indicate the entire of (1) including at least one A, (2) including at least one B, or (3) including both at least one A and at least one B.

As used herein, such terms as "$1^{st}$" and "2nd," or "first" and "second" may be used to define various components regardless of importance or order, and simply distinguish a corresponding component from another without limiting the components. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/to" or "connected" to another element (such as a second element), the element can be directly connected to the other element or can be connected to the other element through another element (e.g., a third element). However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

Terms defined in the present disclosure are used for only describing a specific exemplary embodiment and may not have an intention to limit the scope of other exemplary embodiments. The singular forms are intended to include the plural forms as well, unless the context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. According to various embodiments, examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth.

In some embodiments, the electronic device may be a home appliance. The home appliance may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google Tv™), a game console (e.g., Xbox™, PlayStation™, etc.), an electronic dictionary, an electronic key, a camcorder, and an electronic frame.

In other embodiments, the electronic device may include at least one of various medical equipment (for example, various portable medical measurement devices (a blood glucose monitoring device, a heart rate monitoring device, a blood pressure measuring device, a body temperature measuring device, etc.), a magnetic resonance angiography (MRA), magnetic resonance imaging (MRI), computed tomography (CT), an imaging device, an ultrasonic device, etc.), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, or the like).

According to some embodiments, the electronic device may include a part of a furniture or building/structure, an electronic board, an electronic signature receiving device, a projector, and various measuring instruments (e.g., water, electricity, gas, electric wave measuring devices, etc.). In various embodiments, the electronic device may be one of the above-listed devices or a combination thereof. In some embodiments, the electronic device may be a flexible electronic device. The electronic device according to various embodiments is not limited to the above-listed devices and may include new electronic devices according to technical development.

Hereinafter, an electronic device according to various embodiments of the present disclosure will be described with reference to the accompanying drawings. Herein, the term "user" may refer to a person who uses the electronic device or a device using the electronic device (e.g., an artificial intelligent (AI) electronic device).

Referring to FIG. 1, an electronic device 101 in a network environment 100 according to various embodiments is disclosed. The electronic device 101 may include a bus 110, a processor 120, a memory 130, an input/output (I/O) interface 150, a display 160, and a communication module 170. In some embodiments, the electronic device 101 may not include at least one of the foregoing elements or may further include other elements.

The bus 110 may include a circuit for connecting, e.g., the elements 110 to 170 and delivering communication (e.g., a control message and/or data) between the elements 110 to 170.

The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, commands or data associated with at least one other elements of the electronic device 101. According to an embodiment, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS).

The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141.

In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147. For example, the middleware 143 may perform scheduling or load balancing with respect to the one or more task requests by processing the one or more task requests based on the priority given to the at least one of the application programs 147.

The API 145 is an interface used for the application 147 to control a function provided by the kernel 141 or the middleware 143, and may include, for example, at least one interface or function (e.g., a command) for file control, window control, image processing or character control.

The I/O interface 150 serves as an interface for delivering, for example, a command or data input from a user or another external device to other component(s) of the electronic device 101. The I/O interface 150 may also output a command or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, a symbol, etc.) to users. The display 160 may include a touch screen, and receives a touch, a gesture, proximity, or a hovering input, for example, by using an electronic pen or a part of a body of a user.

The communication module 170 establishes communication between the electronic device 101 and an external device (e.g., a first external electronic device 102, a second external electronic device 104, or a server 106). For example, the communication module 170 may be connected to a network 462 through wireless communication or wired communication to communicate with an external device (e.g., the second external electronic device 104 or the server 106).

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM). The wired communication may include, for example, short-range communication 164. The short-range communication 164 may include, for example, at least one of WiFi, Bluetooth, near field communication (NFC), and a GNSS. Depending on a usage area or bandwidth, the GNSS may include, for example, at least one of a global positioning system (GPS), a global navigation satellite system (Glonass), a Beidou navigation satellite system ("Beidou"), and Galileo, and the European global satellite-based navigation system. Hereinbelow, "GPS" may be used interchangeably with "GNSS". The wired communication may include, for example, at least one of USB, a high definition multimedia interface (HDMI), recommended standard232 (RS-232), and a plain old telephone service (POTS). The network 462 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to an embodiment, the server 106 may include a group of one or more servers. According to various embodiments, some or all of operations performed by the electronic device 101 may be performed in another electronic device or a plurality of other electronic devices (e.g., the electronic device 102 or 104, or the server 106). According to an embodiment, when the electronic device 101 has to perform a function or a service automatically or at a request, the electronic device 101 may request another device (e.g., the electronic device 102 or 104 or the server 106) to perform at least some functions associated with the function or the service, instead of or in addition to executing the function or the service. The another electronic device (e.g., the electronic device 102 or 104 or the server 106) may execute the requested function or an additional function and deliver the execution result to the electronic device 101. The electronic device 101 may then process or further process the received result to provide the requested function or service. To that end, a cloud computing, distributed computing, or client-server computing technology may be used, for example.

Figure 2:
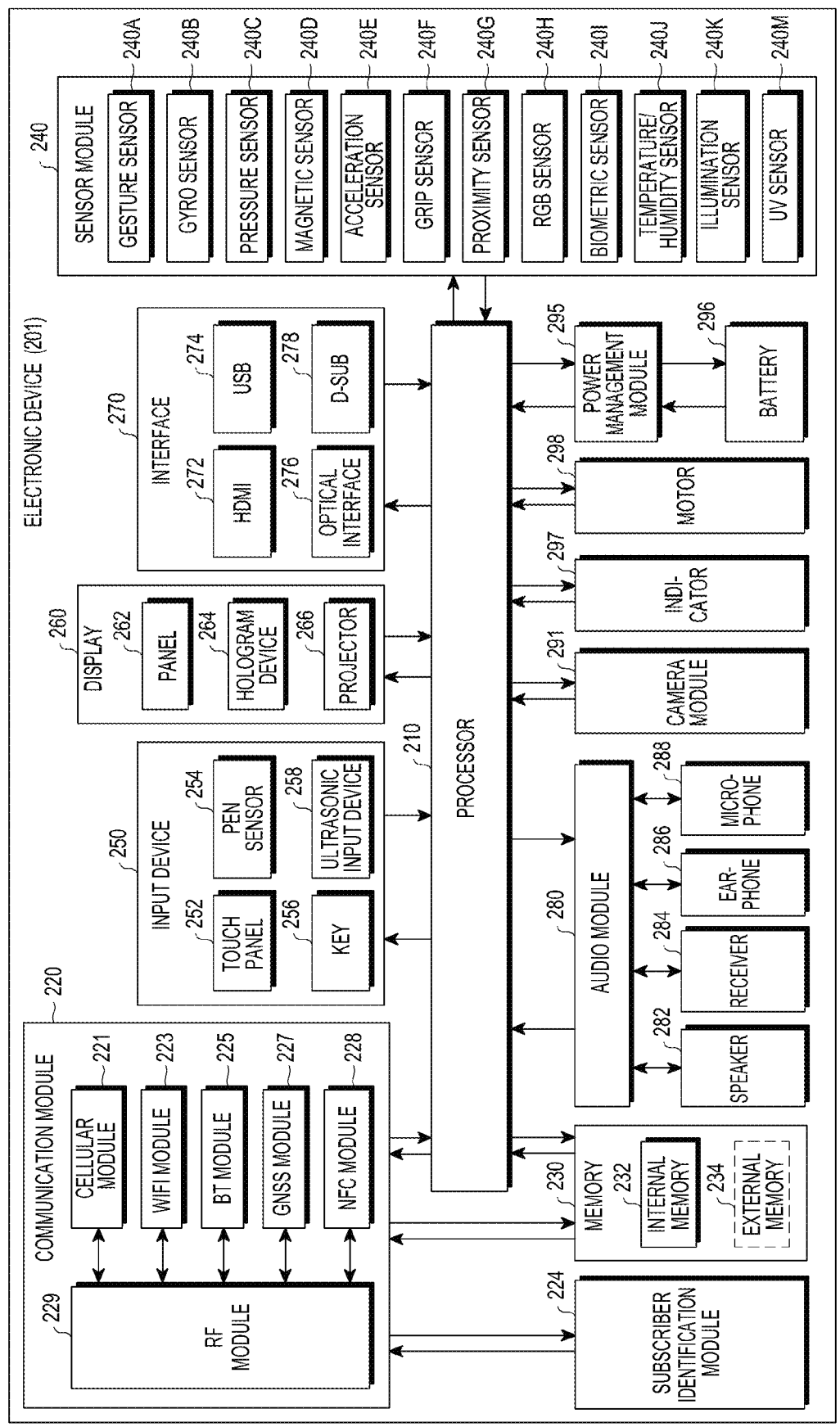
FIG. 2 is a block diagram of an electronic device according to various embodiments.

FIG. 2 is a block diagram of an electronic device 201 according to various embodiments. The electronic device 201 may include the entire electronic device 101 illustrated in FIG. 1 or a part thereof. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 controls multiple hardware or software components connected to the processor 210 by driving an OS or an application program, and performs processing and operations with respect to various data. The processor 210 may be implemented with, for example, a system on chip (SoC). According to an embodiment, the processor 210 may include a GPU and/or an image signal processor. The processor 210 may include at least some of the elements illustrated in FIG. 2 (e.g., the cellular module 221). The processor 210 loads a command or data received from at least one of other elements (e.g., a non-volatile memory) into a volatile memory to process the command or data, and stores various data in the non-volatile memory.

The communication module 220 may have a configuration that is the same as or similar to the communication interface 170 illustrated in FIG. 1. The communication module 220 may include, for example, at least one of the cellular module 221, a WiFi module 223, a Bluetooth (BT) module 225, a GNSS module 227 (e.g., a GPS module, a Glonass module, a Beidou module, or a Galileo module), an NFC module 228, and a radio frequency (RF) module 229.

The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 performs at least one of functions that may be provided by the processor 210. According to an embodiment, the cellular module 221 may include a communication processor (CP).

Each of the WiFi module 223, the BT module 225, the GNSS module 227, and the NFC module 228 may include, for example, a processor for processing data transmitted and received by a corresponding module. According to an embodiment, at least some (e.g., two or more) of the cellular module 221, the WiFi module 223, the BT module 225, the GNSS module 227, and the NFC module 228 may be included in one integrated chip (IC) or IC package.

The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module.

The SIM 224 may include, for example, a card including an SIM and/or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may include, for example, at least one of a volatile memory (e.g., a dynamic random access memory (DRAM), static RAM (SRAM), a synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, NAND flash memory, NOR flash memory, etc.), and a solid state drive (SSD).

The external memory 234 may further include flash drive, for example, compact flash (CF), secure digital (SD), micro-SD, mini-SD, extreme Digital (xD), a multi-media card (MMC), or a memory stick. The external memory 234 may be functionally and/or physically connected with the electronic device 201 through various interfaces.

The sensor module 240 may, for example, measure physical quantity or sense an operation state of the electronic device 201 to convert the measured or sensed information into an electric signal. The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In an embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or is separated from the touch panel 252. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, or a projector 266. The panel 262 may have a configuration that is the same as or similar to the display 160 illustrated in FIG. 1. The panel 262 may be implemented to be flexible, transparent, or wearable. The panel 262 may be configured with the touch panel 252 in one module. The hologram device 264 shows a stereoscopic image in the air by using interference of light. The projector 266 displays an image onto a screen through projection of light. The screen may be positioned inside or outside the electronic device 201. According to an embodiment, the display 260 may further include a control circuit for controlling the panel 262, the hologram device 264, or the projector 266.

The interface 270 may include an HDMI 272, a universal serial bus (USB) 274, an optical communication 276, or a D-subminiature 278. The interface 270 may be included in the communication interface 170 illustrated in FIG. 1. Additionally or alternatively, the interface 270 may include, for example, a mobile high-definition link (MHL) interface, an SD card/MMC interface, or an Infrared Data Association (IrDA) standard interface.

The audio module 280 bi-directionally converts sound and an electric signal. At least some element of the audio module 280 may be included, for example, in the I/O interface 150 illustrated in FIG. 1. The audio module 280 processes sound information input or output through the speaker 282, the receiver 284, the earphone 286, or the microphone 288.

The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.).

The power management module 295 manages power of, for example, the electronic device 201. According to an embodiment, the power management module 295 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and may further include an additional circuit for wireless charging, for example, a coil loop, a resonance circuit, or a rectifier. The battery gauge measures the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. Although not shown, the electronic device 201 may include a processing device (e.g., a GPU) for supporting a mobile TV. The processing device for supporting the mobile TV processes media data according to a standard such as digital multimedia broadcasting (DMB), digital video broadcasting (DVB), mediaFlo™, etc.

Figure 3:
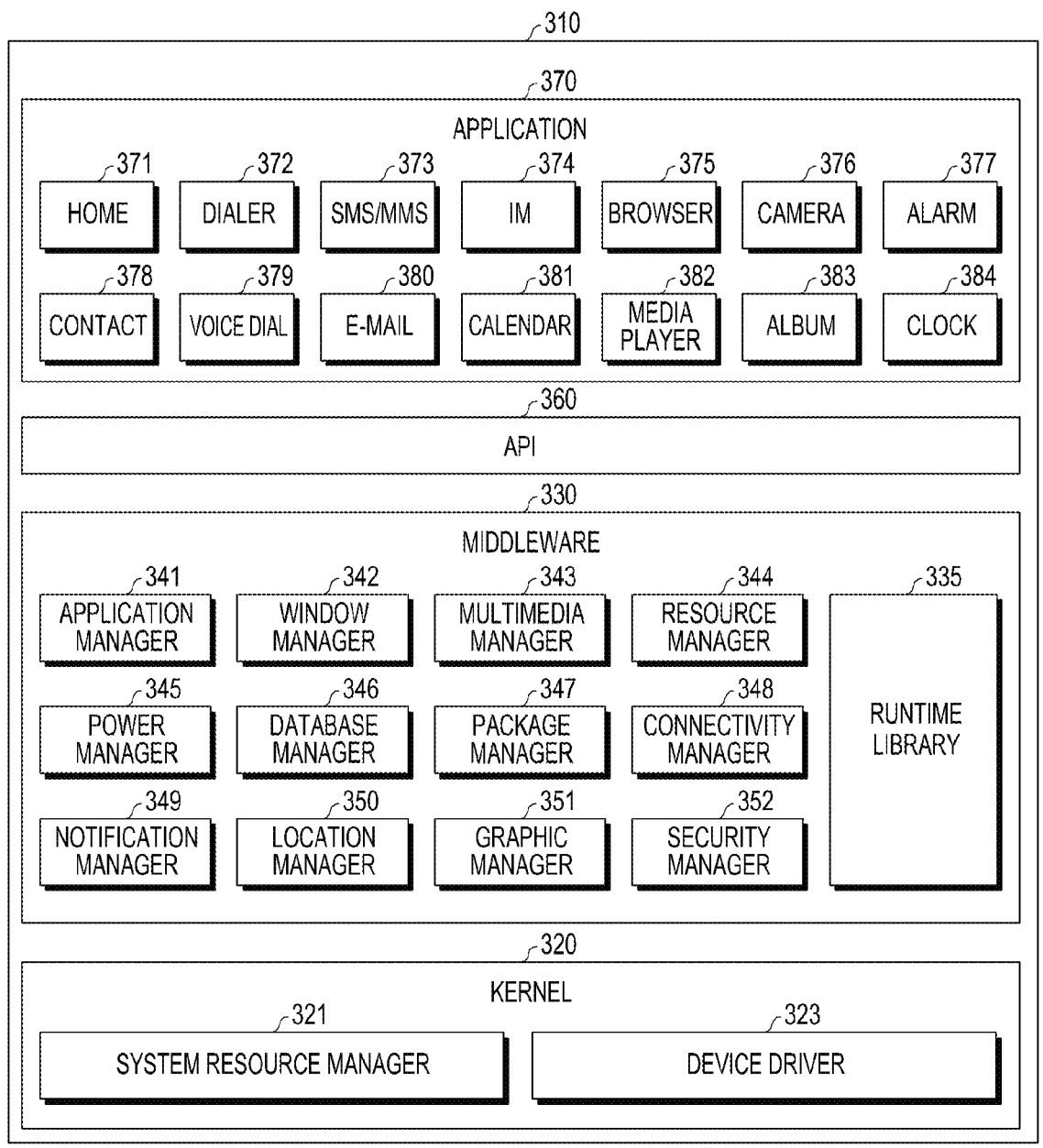
FIG. 3 is a block diagram of a programming module according to various embodiments.

FIG. 3 is a block diagram of a programming module according to various embodiments. According to an embodiment, a programming module 310 (e.g., the program 140) may include an OS for controlling resources associated with an electronic device (e.g., the electronic device 101) and/or various applications (e.g., the application program 147) executed on the OS. The OS may include, for example, Android™, iOS™, Windows™, Symbian™, Tizen™, Bada™, or the like.

The programming module 310 may include, for example, a kernel 320, middleware 330, an application programming interface (API) 360, and/or an application 370. At least a part of the programming module 310 may be preloaded on an electronic device or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may perform control, allocation, retrieval of system resources, and so forth. According to an embodiment, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may provide functions that the applications 370 commonly require, or may provide various functions to the application 370 through the API 360 to allow the application 370 to efficiently use a limited system resource in an electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs functions related to an input/output, memory management, or calculation operation.

The application manager 341 manages a life cycle of at least one of the applications 370. The window manager 342 manages a GUI resource used on a screen. The multimedia manager 343 recognizes a format necessary for playing various media files and performs encoding or decoding with respect to a media file by using a codec appropriate to a corresponding format. The resource manager 344 manages a resource such as source code, a memory, or a storage space of at least one of the applications 370.

The power manager 345 manages a battery or power, for example, in cooperation with a basic input/output system (BIOS) and provides power information necessary for an operation of the electronic device. The database manager 346 generates, searches or changes a database used for at least one of the applications 370. The package manager 347 manages the installation or update of an application distributed in a package file format.

The connectivity manager 348 manages a wireless connection such as a WiFi or Bluetooth connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a user interface related thereto. The security manager 352 provides a general security function necessary for system security or user authentication. According to an embodiment, when the electronic device (e.g., the electronic device 101) has a phone function, the middleware 330 may further include a telephony manager for managing a voice or video call function of the electronic device.

The middleware 330 may include a middleware module forming a combination of various functions of the above-mentioned elements. The middleware 330 may provide modules specified according to types of an OS so as to provide distinctive functions. The middleware 330 may also delete some of existing elements or add new elements dynamically.

The API 360 (e.g., the API 145) may be provided as a set of API programming functions with a different configuration according to the OS. For example, in Android or iOS, one API set may be provided for each platform, and in Tizen, two or more API sets may be provided for each platform.

The application 370 (e.g., the application program 147) may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like).

According to an embodiment, the application 370 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 102 or 104). The notification relay application may receive notification information from an external electronic device to provide the same to a user.

The device management application may manage (e.g., install, remove, or update) at least one function (e.g., turn-on/turn-off of an external electronic device itself (or a part thereof) or control of brightness (or resolution) of a display) of an external device (e.g., the electronic device 102 or 104) communicating with the electronic device, an application operating in an external electronic device or a service (e.g., a call service or a message service) provided in the external electronic device.

According to an embodiment, the application 370 may include an application (e.g., device health care application of mobile medical equipment) designated according to an attribute of the external electronic device (e.g., the electronic device 102 or 104). According to an embodiment, the application 370 may include an application received from the external electronic device (e.g., the server 106 or the electronic device 102 or 104). According to an embodiment, the application 370 may include a preloaded application or a third-party application that may be downloaded from the server. Names of elements of the programming module 310 according to the illustrated embodiment may vary depending on a type of an OS.

According to various embodiments, at least a part of the programming module 310 may be implemented by software, firmware, hardware, or a combination of at least two of them. The at least a part of the programming module 310 may be implemented (e.g., executed) by a processor (e.g., the processor 210). The at least a part of the programming module 310 may include, for example, modules, programs, routines, sets of instructions, or processes for performing one or more functions.

Figure 4:
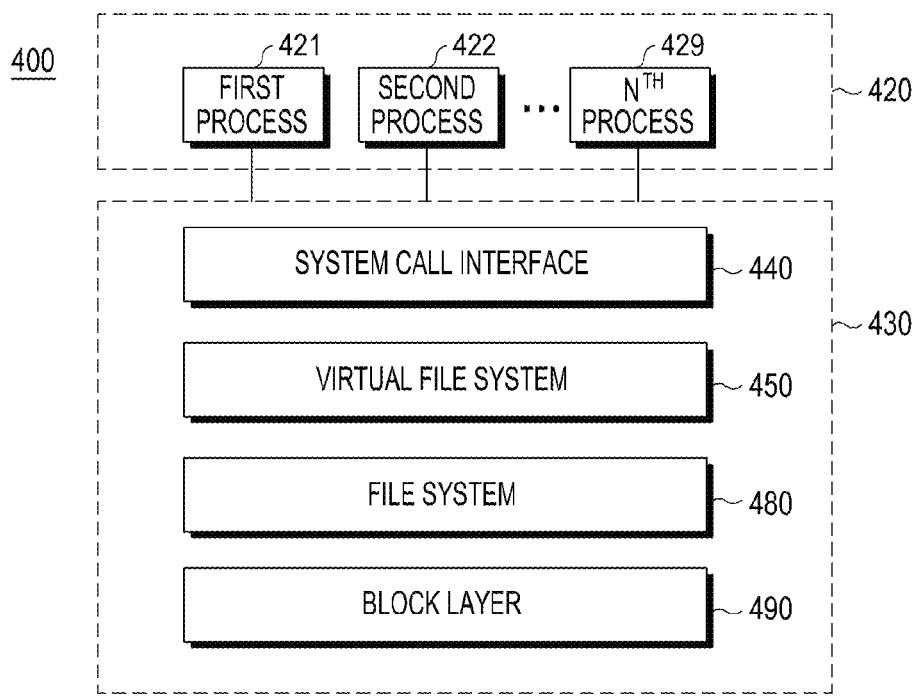
FIG. 4 is a block diagram of a programming module according to various embodiments of the present disclosure.

FIG. 4 is a block diagram of a programming module according to various embodiments of the present disclosure.

Referring to FIG. 4, a programming module 400 may be conceptually divided into an application program 420 operating on a user address space and an operating system 430 operating on a kernel address space, on a virtual memory.

The application program 420 may mean programs operating on the user address space, that is, user processes.

The application program 420 may include a plurality of processes. For example, the application program 420 may include a first process 421, a second process 422, and an $n^{th}$ process 429. Each of the processes 421, 422, and 429 may have its own independent address space. The application program 420 generates a memory space (buffer) on its address space to read a file from a file system of a kernel or write a file on the file system. The application program 420 may correspond to the application 370, the API 360, and the middleware 330 of FIG. 3.

The operating system 430 may correspond to the kernel 320 of FIG. 3. According to various embodiments of the present disclosure, the operating system 430 may include a system call interface 440, a virtual file system 450, a file system 480, and a block layer 490.

The operating system 430 may further include other file systems as well as the virtual file system 450 and the file system 480.

The system call interface 440 allows the application program 420 in a user region to use a function of the operating system 430 in a kernel region, and provides a function for enabling at least one process to access a resource and/or hardware of a kernel.

The virtual file system 450 provides a file system interface to the application program 420. For example, the virtual file system 450 may allow an application program to access any type of a file system in the same manner. The virtual file system 450 may mean an abstract layer above a real file system.

The file system 480 stores data of a file in and inputs and outputs data to and from a storage 540 through the block layer 490. The file system 480 configures and manages data of a file in the unit of a predetermined size called a 'block' or a 'cluster', and inputs and outputs data to and from the block layer 940 in the unit of the predetermined size (or in the unit of an integer multiple of the predetermined size). File data managed by the file system 480 may include meta data generated in the file system and user data input and output by the application program, and in the remaining part of the present disclosure, block-based data managed in the file system will be referred to as a 'data block', a data block corresponding to the meta data of a file will be referred to as a 'meta data block', and a data block corresponding to the user data will be referred to as a 'regular data block'. The file system 480 may also identify various types of files for itself. For example, the file system 480 may identify various types of files such as a regular file, a directory, a link file, and so forth, and store them in a storage.

In the present disclosure, a type of the file system 480 is not limited to a particular file system. For example, various file systems of various operating systems such as an FAT file system of a Window operating system, an Ext file system of Linux, and so forth may be used in the present disclosure. In the remaining part of the present disclosure, a data size unit managed in the file system and a type of the data size unit will be described as a 'block' (e.g., a meta data block and a regular data block), but other terms (e.g., a 'cluster') may be used depending on a type of the file.

The file system 480 may also include a plurality of file systems. For example, the file system 480 may include stackable file systems having a plurality of file systems mounted thereon.

The block layer 490 is obtained by virtualizing at least partial memory region including at least one storage 540 as a 'block device' layer. The block layer 490 inputs and outputs data to and from the storage 540 in the unit of a predetermined size (e.g., a block) or in the unit of an integer multiple of the predetermined size (e.g., an array of blocks).

The unit of the predetermined size may be referred to as another term such as the 'cluster' or a 'sector' as well as the 'block', depending on a type of a file system or a storage. While the term 'block' (e.g., a block unit, a block device, and a block encryption device) will be used as a representative term in the other part of the present disclosure, the use of the term is not intended to limit the present disclosure to a particular term.

In the block layer 490, a block encryption module may be further provided. According to various embodiments of the present disclosure, the block layer 490 activates (loads or mounts) a block encryption module 790 to encrypt/decrypt data of a block input to and output from an upper or lower layer. According to various embodiments of the present disclosure, encryption/decryption of data may be performed in the block layer 490 (through software or dedicated hardware), or the data may be set to be encrypted/decrypted in the block layer 490. Outside the block layer 490 (e.g., at a direct memory access (DMA) timing or inside a storage), encryption/decryption of data may be performed.

In the remaining part of the present disclosure, a 'block device' may mean a device virtualized by a 'block layer'. That is, a file system may input and output data of a file to and from the 'block device' in the unit of a block (or on a block-by-block basis). In the remaining part of the present disclosure, a 'block encryption device' may mean a device into which the 'block encryption module 790' is virtualized by an 'activated block layer'. That is, a file system may input and output data of a file to and from the 'block encryption device' in the unit of a block.

The block layer 490 may include a block device driver for providing an interface with at least one device. For example, the block layer 490 may include a block device driver for providing an interface with a storage 540 to be described below.

In various embodiments of the present disclosure, when the block layer 490 performs input/output (I/O) operations with respect to the storage 540 in the unit of a block (or an integer multiple thereof), physical data copying between memory regions may be performed by a DMA module 530 to be described below.

In the remaining part of the present disclosure, the 'block' may mean not only a particular size unit of data and a data storing space in the size unit, but also data stored in the data storing space. That is, encryption of a 'block' may mean encryption of data stored in the 'block'.

Figure 5:
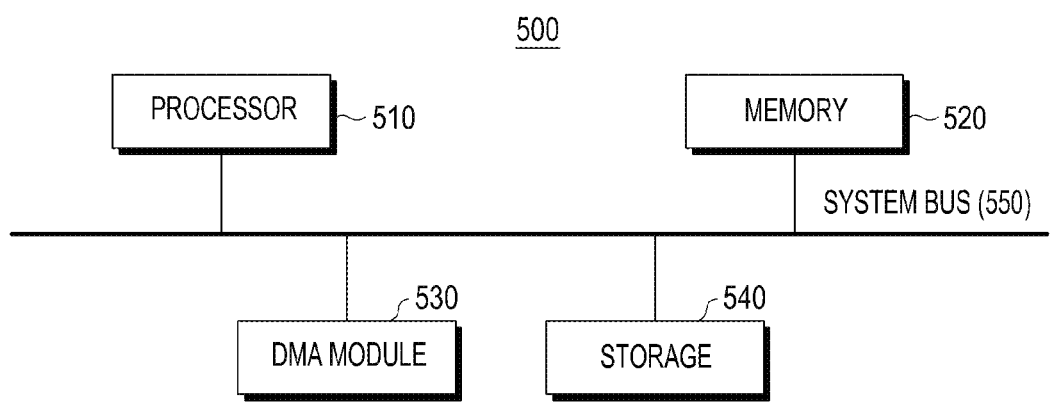
FIG. 5 is a block diagram of an electronic device according to various embodiments of the present disclosure.

FIG. 5 is a block diagram of an electronic device according to various embodiments of the present disclosure.

Referring to FIG. 5, an electronic device 500 may include a processor 510, a memory 520, the DMA module 530, and the storage 540. The processor 510, the memory 520, the DMA module 530, and the storage 540 may be connected by a system bus 550.

The processor 510 may be the above-described processor 120 or 210, or a part thereof. The processor 510 may execute a code of the programming module 400 described with reference to FIG. 4 to perform an instruction corresponding to the code. The processor 510 may issue an instruction to the DMA module 530 to cause the DMA module 530 to copy data between the memory 520 and the storage 540.

The memory 520 stores a code and data of the programming module 400 described with reference to FIG. 4. The memory 520 corresponds to the volatile memory described with reference to FIGS. 1 and 2. According to an embodiment, the memory 520 may include a plurality of buffers for storing data of the process 420, the file system 480, and the block layer 490.

The DMA module 530 transmits data between memory regions or between the memory 520 and an I/O device. For example, the DMA module 530 may set up a channel in the memory 520 and in the storage 540 to copy data by bypassing the processor 510. The DMA module 530 encrypts or decrypts data in the above-described DMA operation. This will be described later. The DMA module 530 may be located inside a storage controller on an AP, without being limited to a particular location.

The storage 540, which is a data storage device, may correspond to the non-volatile memory and the recording medium described with reference to FIGS. 1 and 2. For example, the storage 540 may be a flash memory such as a universal flash storage (UFS), an embedded multi-media card (eMMC), an SD card, an ultra-high speed (UHS) card, a universal flash storage (UFS) card, or the like.

According to various embodiments of the present disclosure, among all blocks corresponding to a file of a file system to be stored in the storage 540, data of some blocks may be stored after encrypted, and data of other some blocks may be stored without being encrypted.

The system bus 550 may be a path through which each of the processor 510, the memory 520, the DMA module 530, and the storage 540 exchanges data and instructions with another one of them.

The electronic device 101 selectively encrypts at least some of data blocks corresponding to a file through file tree scan in the file system, based on at least one of a type of the file, an access authority to the file, a user of the file, and a group to which the file belongs.

For example, the electronic device 101 may identify all file types included in the file system through the file tree scan in the file system and determine to encrypt a data block corresponding to a particular file type (e.g., a regular file). This will be described in detail below.

Figure 6:
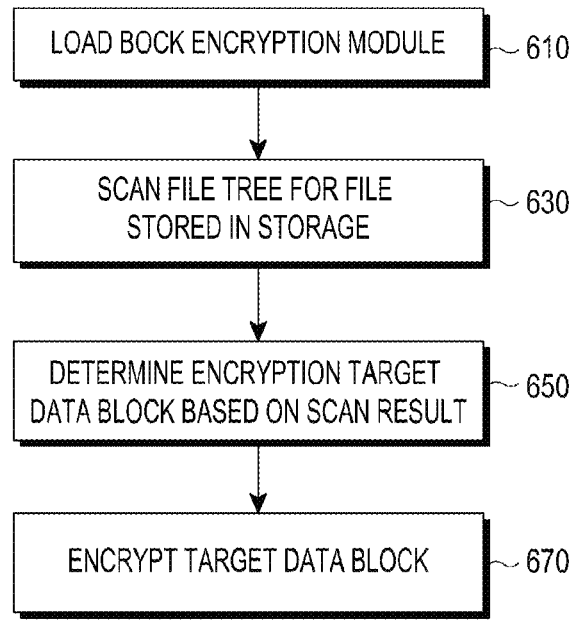
FIG. 6 is a flowchart of a block encryption operation according to various embodiments of the present disclosure.

FIG. 6 is a flowchart of a block encryption operation according to various embodiments of the present disclosure.

In operation 610, the electronic device 101, for example, the processor 510 loads the block encryption module 790 in the block layer 490 to encrypt a block device. Thus, the block encryption device that is distinguished from an existing block device may be virtualized on software.

Herein, the block encryption module 790 may encrypt or decrypt at least one block or may set the at least one block to be encrypted/decrypted.

In an embodiment, the electronic device 101 may set a user password or a user key as an encryption key for block encryption/decryption in the block encryption module 790.

In operation 630, the electronic device 101, for example, an encryption switch module 750 scans a file tree of at least one file stored in the storage 540. For example, the encryption switch module 750 may scan a file tree for at least one file system stored in the storage 540 and may identify information about the at least one file through the file tree scan. Herein, the encryption switch module 750 scans the file tree and controls switch of an encryption operation of the block encryption module 790.

The electronic device 101 scans the file tree of the at least one file stored in the storage 540, by using well-known various algorithms and utility tool. In an embodiment, the encryption switch module 750 may scan lower files and directories from the uppermost root directory (or a root file) in the file system stored in the storage 540. Thus, the encryption switch module 750 may identify additional information (e.g., a file type, a file owner, a file authority, a file group, etc.) of each of at least some files included in the file system through the file tree can. In operation 650, the electronic device 101, for example, the encryption switch module 750, determines an encryption-target file or an encryption-target data block based on a scan result.

According to an embodiment, the electronic device 101, for example, the encryption switch module 750 may scan the file tree to identify a regular file among a plurality of file types included in the file system, and determine a data block included in the regular file as an encryption target. According to an embodiment, the encryption switch module 750 may determine only some data blocks, except for meta data blocks, among data blocks of the regular file, as encryption targets.

According to various embodiments, the electronic device 101, for example, the encryption switch module 750 may scan the file tree to identify a directory file among the plurality of files included in the file system, and determine a data block belonging to the directory file as a non-encryption target.

According to various embodiments, the electronic device 101, for example, the encryption switch module 750 may scan the file tree to determine a data block included in a file having an attribute of a particular owner, a particular group, or a particular authority among the plurality of files included in the file system, as an encryption target or a non-encryption target. According to an embodiment, the encryption switch module 750 may determine a file having an attribute of an owner having a system authority or a root authority, as a non-encryption target.

According to various embodiments, the electronic device 101, for example, the encryption switch module 750 may scan the file tree to determine a data block included in a file under a particular position (a directory) among the plurality of files included in the file system as an encryption target or a non-encryption target. According to an embodiment, the encryption switch module 750 may determine a file under a position (a directory) where an application program execution code file or library files are stored, as a non-encryption target.

While operations 630 and 650 are described as separate operations or steps for convenience, a data block that is an encryption target may be determined during file scan.

According to an embodiment, the electronic device 101 may store information about a data block determined as an encryption target in an information material structure such as a data block bitmap in operations 630 and 650. For example, the data block bitmap may be a bitmap in which whether blocks including at least a partial region of the storage 540 are encryption targets or not is checked. For a storage having a memory space of 1024 blocks, the electronic device 101 may record whether each block is an encryption target or not by checking (or clearing) so in each bit in a bitmap of 128 bytes (1024 bits).

The electronic device 101 may check (or clear) a bit of an encryption-target block in the data block bitmap in operations 630 and 650, or may perform encryption with respect to data blocks determined as encryption targets on the storage 540 at a time by referring to the checked bitmap information material structure in operation 670.

In operation 670, the electronic device 101, for example, the block encryption module 790, encrypts a block determined as an encryption target.

In an embodiment, the encryption switch module 750 may read the original data of a data block determined as an encryption target from an existing block device and write the original data to the block encryption device to encrypt the data. At this time, according to various embodiments of the present disclosure, the above-described data block bitmap material structure may be used.

Figure 7:
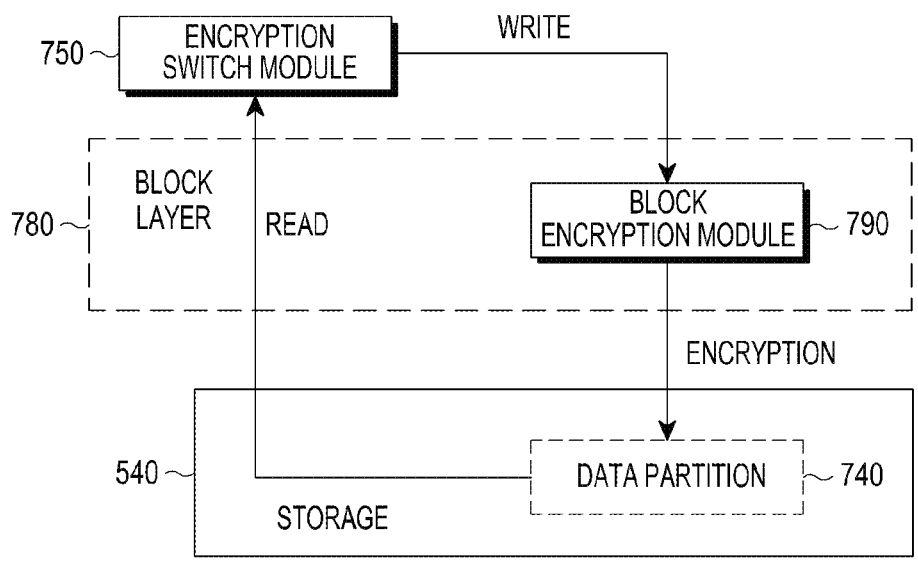
FIG. 7 is a conceptual diagram of a block encryption operation according to various embodiments of the present disclosure.

FIG. 7 is a conceptual diagram of a block encryption operation according to various embodiments of the present disclosure. Referring to FIG. 7, the electronic device 101 may include, for example, the encryption switch module 750, the block encryption module 790, and the storage 540.

The electronic device 101 may encrypt a block device corresponding to the electronic device 101 depending on user's selection or a configuration of the electronic device 101 (e.g., at the time of user's initial booting). Thus, the block device corresponding to the electronic device 101 may be switched into the block encryption device. When the block device corresponding to the electronic device 101 is initially switched into the block encryption device, a process of scanning a file tree and a process of determining an encryption target based on a scan result are required.

Referring to FIG. 7, the encryption switch module 750 may switch the block device into the block encryption device.

According to an embodiment of the present disclosure, the encryption switch module 750 may scan a file tree of at least one file (or a file system) stored in the storage 540 or may determine whether to encrypt each of at least one block corresponding to the at least one file based on a scan result. Thus, the encryption switch module 750 may selectively encrypt data blocks of a file when switching the block device into the block encryption device.

When encrypting the block device, the encryption switch module 750 reads the original data stored in the storage 540 corresponding to the block device and encrypts the read original data.

More specifically, the encryption switch module 750 may read the original data from a block layer 780 and write the read original data in the block encryption module 790 to be described below. The block encryption module 790 encrypts the original data and writes the encrypted original data in the storage 540. The block encryption module 790 encrypts at least one block corresponding to at least one file. The block encryption module 790 also decrypts the encrypted block. For example, the block encryption module 790 may encrypt or decrypt a plurality of consecutive blocks when performing I/O operations with respect to the plurality of consecutive blocks.

The block encryption module 790 may be loaded in the block layer 780. The block encryption module 790 may virtualize the block layer 780 as the block encryption device. Thus, the file system 480 may store the block encrypted by the block encryption module 790 in the storage 540.

Meanwhile, once a regular file is scanned during the above-described file tree scan process, the electronic device 101 may write a block or a cluster corresponding to the scanned regular file to the block encryption module 790, and after identifying the block or the cluster corresponding to the scanned regular file during the file tree scan process, may write the block or the cluster to the block encryption module 790 at a time after completion of the scan. The block encryption module 790 then encrypts the block corresponding to the scanned regular file during the file tree scan process, and encrypts the block corresponding to the regular file at a time after completion of the scan.

The block encryption module 790 may virtualize at least a partial region of the storage 540 as the block encryption device. According to an embodiment of the present disclosure, the electronic device 101 may virtualize, as the block encryption device, a data partition 740 on the storage 540 where user data is stored.

The block layer 780 may mean a layer for interfacing of file data configured in the file system with the storage 540. Thus, in the block layer 780, data may be input or output on a block-by-block basis. The storage 540 may be a storage device that is a block encryption target.

All regions of the storage 540 or some regions thereof may be mapped to a block device. The programming module 400 may mount a file system on the mapped block device. Thus, the programming module 400 may be connected to a file stored in the storage 540.

In various embodiments of the present disclosure, an electronic device includes a non-volatile storage, a volatile memory, and a processor electrically connected with the storage and the memory, in which the storage stores instructions for causing, when executed, the processor to configure a block layer for virtualizing the storage as a block device on the memory, to store a file in the configured block layer in a unit of a block, to selectively encrypt the file, stored in the unit of the block, in the unit of the block, and to store at least one of the encrypted block or a non-encrypted block in the storage.

In various embodiments of the present disclosure, an operation method of an electronic device may include configuring a block layer for virtualizing the storage as a block device on the memory, storing a file in the configured block layer in a unit of a block, selectively encrypting the file, stored in the unit of the block, in the unit of at least one block, and storing at least one of the encrypted block or a non-encrypted block in the storage.

According to various embodiments of the present disclosure, a computer-readable storage medium has recorded therein instructions for executing operations of configuring a block layer for virtualizing the storage as a block device on the memory, storing a file in the configured block layer in a unit of a block, selectively encrypting the file, stored in the unit of the block, in the unit of at least one block, and storing at least one of the encrypted block or a non-encrypted block in the storage.

Meanwhile, the electronic device 101 according to various embodiments of the present disclosure may selectively perform encryption of a block based on block information about the block. Hereinafter, a detailed description thereof will be provided.

Figure 8:
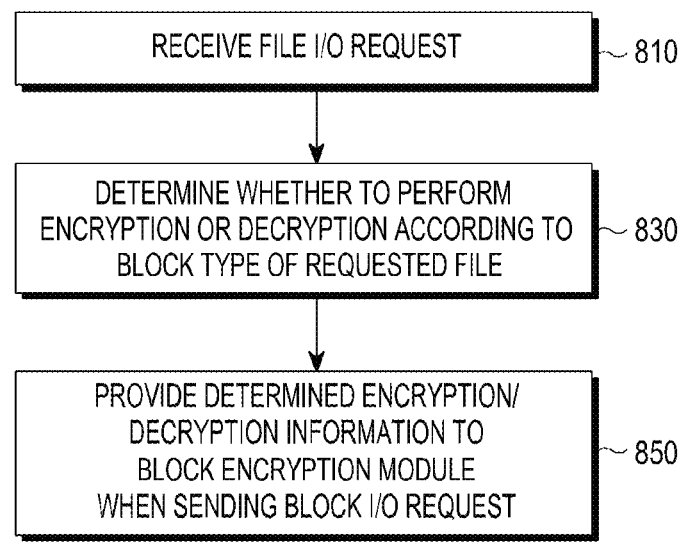
FIG. 8 is a flowchart of an operation of configuring information indicating whether to encrypt a block in response to an input and output request according to various embodiments of the present disclosure.

FIG. 8 is a flowchart of an operation of configuring information indicating whether to encrypt a block in response to a file input/output request according to various embodiments of the present disclosure.

Referring to FIG. 8, in operation 810, the file system 480 receives a file I/O request from an application program 910.

In operation 830, the file system 480 determines whether to perform encryption or decryption according to a block type of a file corresponding to the file I/O request. Herein, there may be a plurality of blocks in the file corresponding to the file I/O request. The block type of the file corresponding to the file I/O request may mean a block type of the file system.

According to various embodiments of the present disclosure, the file system 480 may determine a meta data block among data blocks of the file as a non-encryption target. The file system 480 may determine a regular data block among the data blocks of the file as an encryption target.

According to various embodiments of the present disclosure, the file system 480 may determine a data block of a file belonging to a particular type as an encryption target or a non-encryption target, according to internally classified file types. For example, the file system 480 may determine a data block of a regular file as an encryption target and a data block of a directory file as a non-encryption file.

According to various embodiments of the present disclosure, the file system 480 may determine a data block of a file belonging to a particular owner, a particular group or a particular authority as an encryption target or a non-encryption target. For example, the encryption switch module 750 may determine a file having an attribute of an owner having a system authority or a root authority as a non-encryption target.

According to various embodiments of the present disclosure, the file system 480 may determine a data block of a file under a particular position (a directory) as an encryption target or a non-encryption target. According to an embodiment, the encryption switch module 750 may determine files included in a directory having stored therein an application program execution file or library files as non-encryption targets. In operation 850, when sending a block I/O request to the block layer 780, the file system 480 delivers encryption/decryption information about whether to perform encryption or decryption determined in operation 830 to the block encryption module 790. Herein, the encryption/decryption information may be delivered through block information or a block I/O interface (e.g., a factor parameter).

Thus, the block encryption module 790 may encrypt or decrypt a block based on the encryption/decryption information at the time of block I/O.

This will be described in detail with reference to FIG. 9.

Figure 9:
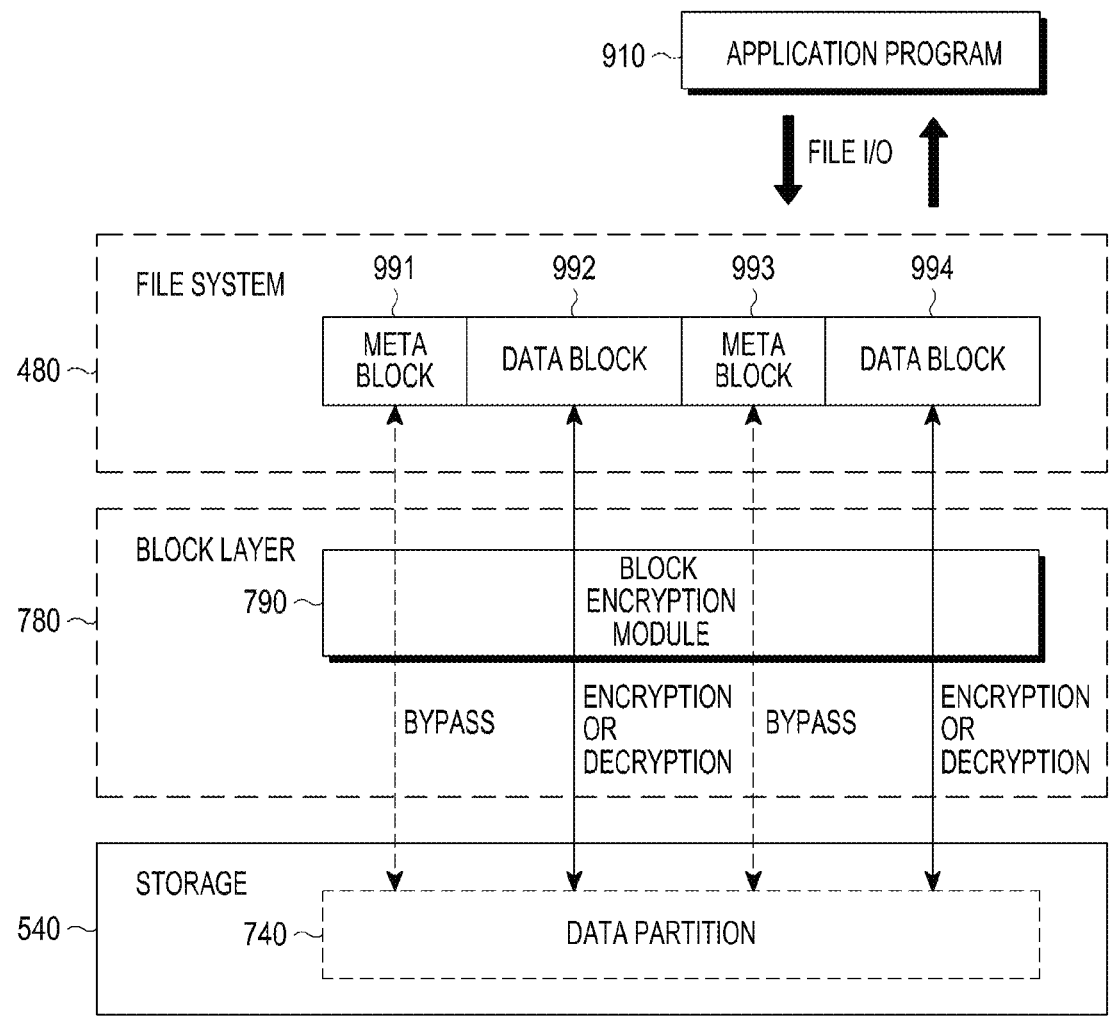
FIG. 9 is a diagram of a block encryption operation based on a type of a block according to various embodiments of the present disclosure.

FIG. 9 is a diagram of a block encryption operation based on a block type according to various embodiments of the present disclosure.

Referring to FIG. 9, an application program 910 sends a file I/O request to the file system 480. The file system 480 inputs or outputs at least one file in response to the file I/O request of the application program 910. Herein, a file corresponding to the file I/O request may include at least one block. For example, the file corresponding to the file I/O request may include at least one meta data block and at least one regular data block in the file system 480. In another example, the file corresponding to the file I/O request may include at least one meta data block. The file system 480 may be an arbitrary file system among the above-described variety of file systems. Herein, blocks may be classified into meta data blocks 991 and 993 including meta data about a file and regular data blocks 992 and 994 including regular data that is not meta data. The meta data blocks 991 and 993 may be blocks including meta data that manages the file system. For example, the meta data blocks 991 and 993 may include a super block, a group block descriptor, an index node (inode), a file assignment table (FAT), an indirect block, a data bitmap block, an inode bitmap block, or the like. The regular data blocks 992 and 994 may be blocks including regular data that is not the meta data. The block encryption module 790 of the block layer 780 operates as a bypass module that does not encrypt the meta data blocks 991 and 993, and encrypts or decrypts the regular data blocks 992 and 994. For example, the block encryption module 790 may not encrypt a meta data block among at least one block for the file corresponding to the file I/O request and may encrypt a regular data block that is not the meta data block, based on encryption/decryption information delivered from the file system 480. According to an embodiment, the block encryption module 790 may write encrypted blocks corresponding to the regular data blocks 992 and 994 to the data partition 740 of the storage 540. The block encryption module 790 may write bypassed blocks corresponding to the meta data blocks 991 and 993 to the data partition 740 of the storage 540. Thus, the electronic device 101 may perform a bypass operation of not encrypting the data corresponding to the meta data blocks 991 and 993, and store the data in the data partition 740, and encrypt the data corresponding to the regular data blocks 992 and 994 and store the encrypted data in the data partition 740. In various embodiments of the present disclosure, according to various policies for determining encryption and decryption with respect to the file system described with reference to FIG. 8 (based on the encryption and decryption information delivered from the file system), the block encryption module 790 may selectively encrypt and decrypt a block.

In another example, when an encryption tag indicating an encryption target is tagged in an identified block, the electronic device 101 may encrypt the identified block; when a non-encryption tag indicating a non-encryption target is tagged in the identified block, the electronic device 101 may not encrypt the identified block. This will be described with reference to FIGS. 10 and 11.

Figure 10:
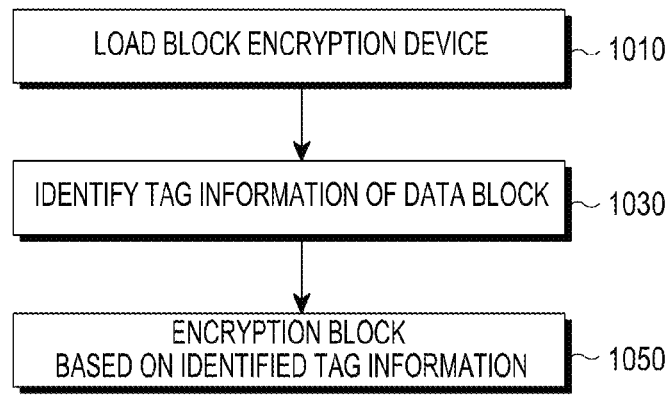
FIG. 10 is a flowchart of a block encryption operation according to various embodiments of the present disclosure.

FIG. 10 is a flowchart of a block encryption operation according to various embodiments of the present disclosure.

Referring to FIG. 10, in operation 1010, the electronic device 101 loads the block encryption module 790 in the block layer 780 for encryption by the block encryption module 790 that encrypts a data block.

In operation 1030, the electronic device 101, for example, the block encryption module 790, identifies tag information of a block that is requested to be input or output from an upper layer (e.g., a file system). For example, the block encryption module 790 may identify tag information of at least one block of a file corresponding to a block input and output file I/O request generated in the file system, in response to a file I/O request from the application program 910. Herein, the tag information may include information about whether to perform encryption or decryption.

According to an embodiment, the tag information may be delivered together with the I/O request from the upper layer.

According to another embodiment, the tag information may be stored in a partial region of the storage or another memory. For example, tag information of blocks may be previously stored in a form such as a block bitmap material structure, and the file system or the block encryption device may read the tag information to identify tag information about a desired block.

In operation 1050, the electronic device 101, for example, the block encryption module 790, encrypts at least one block based on the identified tag information. For example, when the identified tag is the encryption tag indicating an encryption target, the block encryption module 790 may encrypt a block corresponding to the encryption tag. When the identified tag is the non-encryption tag indicating a non-encryption target, the block encryption module 790 may not encrypt a block corresponding to the non-encryption tag.

Figure 11:
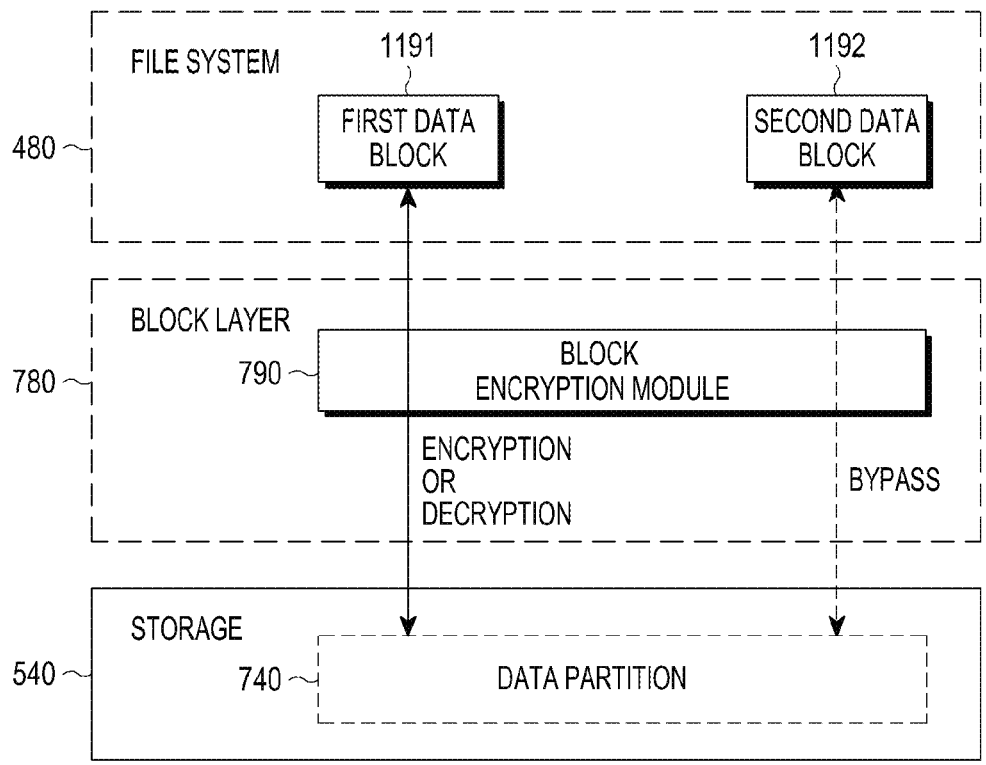
FIG. 11 is a diagram of a block encryption operation according to various embodiments of the present disclosure.

FIG. 11 is a diagram of a block encryption operation based on tag information according to various embodiments of the present disclosure.

Referring to FIG. 11, the file system 480 may include a first data block 1191 that needs encryption and a second data block 1192 that does not need encryption. The file system 480 may tag the encryption tag in the first data block 1191 that needs encryption and tag the non-encryption tag in the second data block 1192 that does not need encryption. Thus, when processing file input and output, the file system 480 tags the encryption tag in the first data block 1191 that needs encryption and sends an input/output request to the block encryption module 790, and tags the non-encryption tag in the second data block 1121 that does not need encryption and sends an input/output request to the block encryption module 790. In an embodiment, when sending an input/output request for at least one block to the block encryption module 790, the file system 480 may add information about whether to perform encryption to a block i/o (bio) structure that is a block structure, to deliver the same to the block encryption block 790. The block encryption module 790 may encrypt or decrypt the first data block 1191 in which the encryption tag is tagged, or may encrypt the first data block 1191 in which the encryption tag is tagged and store the encrypted first data block 1191 in the data partition 740. The block encryption module 790 may bypass encryption of the second data block 1192 in which the non-encryption tag is tagged so as not to encrypt the second data block 1192, or may bypass encryption of the second data block 1192 in which the non-encryption tag is tagged and store the second data block 1192 in the data partition 740. The foregoing description of the encryption tag is an example, and the electronic device 101 according to various embodiments of the present disclosure may deliver a tag indicating whether to encrypt a block to a block layer in various manners. A tag indicating whether to perform encryption may be tagged only in a block corresponding to any one of a block that needs encryption and a block that does not need encryption.

In various embodiments of the present disclosure, an electronic device includes a non-volatile storage, a volatile memory, and a processor electrically connected with the storage and the memory, in which the storage stores instructions for causing, when executed, the processor to virtualize the storage as a block device on the memory and to selectively encrypt or decrypt a block of a file corresponding to an input or output request for a file stored in the storage, based on an encryption tag indicating information about whether to perform encryption, which is tagged in the input or output request, in response to the input or output request.

In various embodiments of the present disclosure, an operation method of an electronic device includes virtualizing a storage as a block device on a memory and selectively encrypting or decrypting a block of a file corresponding to an input or output request for a file stored in the storage, based on an encryption tag indicating information about whether to perform encryption, which is tagged in the input or output request, in response to the input or output request.

In various embodiments of the present disclosure, a computer-readable storage medium has stored therein instructions for executing operations of virtualizing a storage as a block device on a memory and selectively encrypting or decrypting a block of a file corresponding to an input or output request for a file stored in the storage, based on an encryption tag indicating information about whether to perform encryption, which is tagged in the input or output request, in response to the input or output request.

The electronic device 101 according to various embodiments of the present disclosure may selectively perform encryption or decryption with respect to a block, when driving a file system utility.

Figure 12:
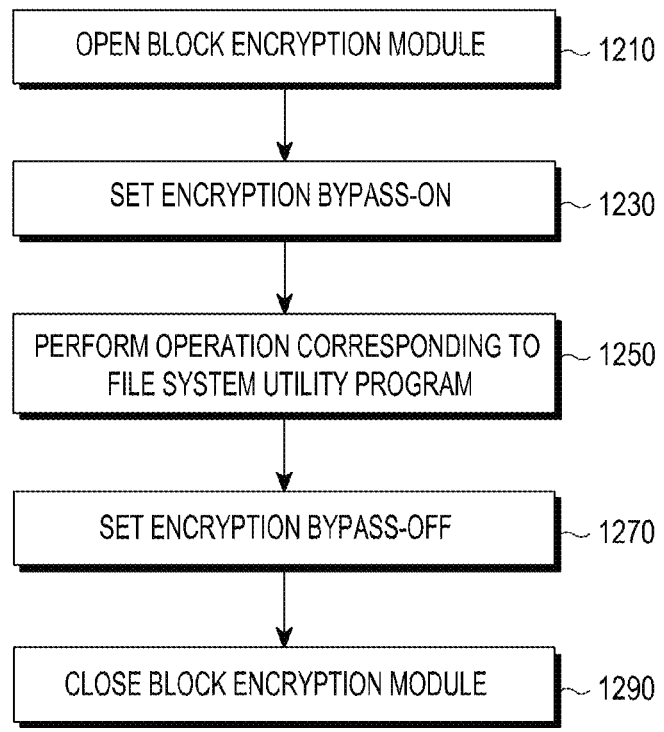
FIG. 12 is a flowchart of an encryption operation based on a file system utility according to various embodiments of the present disclosure.

FIG. 12 is a flowchart of an encryption operation based on a file system utility according to various embodiments of the present disclosure.

Figure 13:
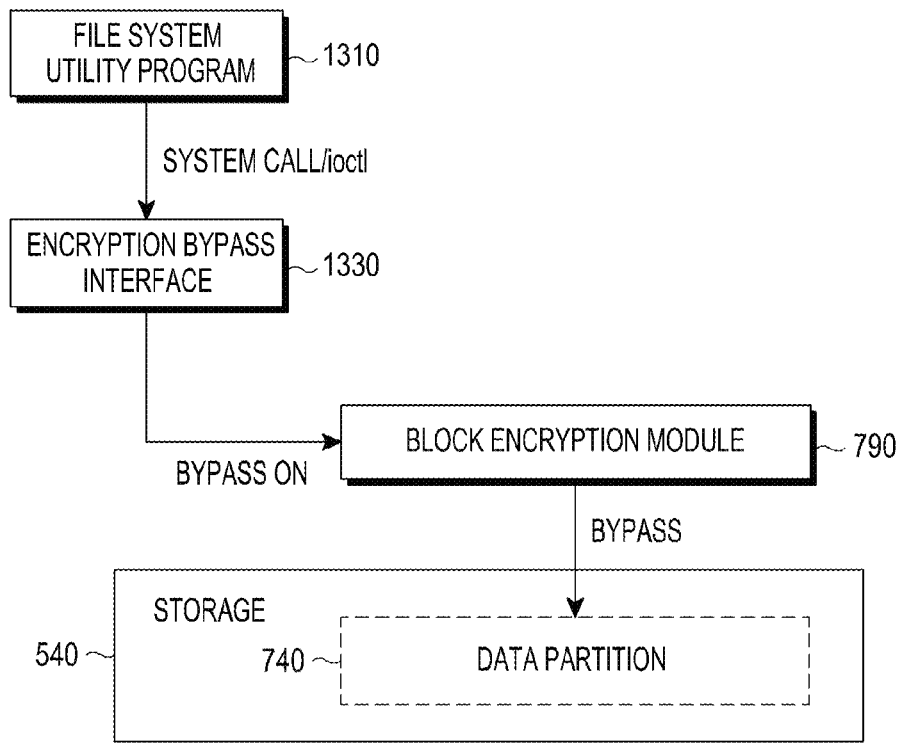
FIG. 13 is a diagram of an encryption operation corresponding to a file system utility according to various embodiments of the present disclosure.

FIG. 13 is a diagram of an encryption operation corresponding to a file system utility according to various embodiments of the present disclosure.

Referring to FIG. 12, in operation 1210, the electronic device 101 opens the block encryption module 790.

The electronic device 101 may open the block encryption module 790 according to driving of the file system utility and open the block encryption module 790 exclusively to the driven file system utility according to driving of the file system utility. Herein, the file system utility, which is a program resident on a user address space, may send an input/output request for the storage 540 to the block layer 780 operating in a kernel, for example, the block encryption module 790. For example, input or output based on driving of the file system utility may be implemented by I/O control (IOCTL) or system call. An operation corresponding to driving of the file system utility may include, for example, an operation corresponding to at least one of file system error check, file system recovery, format tool, and resize tool.

In operation 1230, the electronic device 101 sets encryption bypass-on to cause the block encryption module 790 not to perform encryption. Thus, the block encryption module 790 may not perform encryption with respect to a block.

In operation 1250, the electronic device 101 performs an operation corresponding to a file system utility program 1310. According to various embodiments of the present disclosure, the electronic device 101 may perform an operation corresponding to the file system utility program 1310 in a bypass state (or mode) where the block encryption module 790 does not perform encryption. Thus, according to various embodiments of the present disclosure, data that is input and output by the file system utility program 1310 through the block encryption device may not be encrypted or decrypted by the block encryption module 790. In various embodiments of the present disclosure, when performing an operation corresponding to the file system utility program 1310, the electronic device 101 may open a mapped block device exclusively to the file system utility program 1310, thereby to prevent collision caused by an operation of the file system.

In operation 1270, the electronic device 101 sets an encryption bypass-off after performing the operation corresponding to the file system utility program 1310. Thus, the block encryption module 790 may perform encryption with respect to data.

In operation 1290, the electronic device 101 closes the opened block encryption module 790.

Referring to FIG. 13, a file system utility program 1310 requests input/output with respect to the storage 540. The file system utility program 1310 may directly access a block layer without passing through the file system to request input/output of data. In a general case, the file system utility program 1310 may request input/output of meta data block data among data generated and stored by the file system. According to various embodiments of the present disclosure, the file system utility program 1310 controls the block encryption module 790 not to perform encryption, through an encryption/decryption bypass interface 1330.

The encryption/decryption bypass interface 1330 may control the block encryption module 790 not to perform encryption in response to a request of the file system utility program 1310. For example, in response to the request of the file system utility program 1310, the encryption/decryption bypass interface 1330 may control the block encryption module 790 to operate in the bypass mode where the block encryption module 790 does not perform encryption. Herein, the encryption/decryption bypass interface 1330 may include an interface that relays the user address space with the kernel. For example, implementation in the form of system call or IOCTL may be included.

Under control of the encryption/decryption bypass interface 1330, the block encryption module 790 may operate in the bypass mode where the block encryption module 790 does not encrypt a block. According to various embodiments of the present disclosure, the block encryption module 790 may bypass encryption without encrypting or decrypting data input/output corresponding to the file system utility program 1310 to read or write data stored in at least a partial region (e.g., the data partition 740) of the storage 540.

In various embodiments of the present disclosure, an electronic device includes a non-volatile storage, a volatile memory, and a processor electrically connected with the storage and the memory, in which the storage stores instructions for causing, when executed, the processor to virtualize the storage as a block device on the memory, to selectively encrypt at least one block corresponding to a file stored in the virtualized storage, and to avoid encrypting an input or an output generated by driving of a file system utility.

In various embodiments of the present disclosure, an operation method of an electronic device includes virtualizing a storage as a block device on a memory and selectively encrypting at least one block corresponding to a file stored in the virtualized storage and avoiding encrypting an input or an output generated by driving of a file system utility.

In various embodiments of the present disclosure, a computer-readable storage medium has stored therein instructions for executing operations of virtualizing a storage as a block device on a memory and selectively encrypting at least one block corresponding to a file stored in the virtualized storage and avoiding encrypting an input or an output generated by driving of a file system utility.

In various embodiments of the present disclosure, an electronic device includes a non-volatile storage, a volatile memory, and a processor electrically connected with the storage and the memory, in which the storage stores instructions for causing, when executed, the processor to configure a block layer for virtualizing the storage on the memory, to store a file in the configured block layer as at least one block in the memory, to selectively encrypt the at least one block, and to store the file including the selectively encrypted block in the storage.

In various embodiments of the present disclosure, a recording medium readable by an electronic device includes a program for executing operations of configuring a block layer for virtualizing the storage on the memory, storing a file in the configured block layer as at least one block in the memory, selectively encrypting the at least one block, and storing the file including the selectively encrypted block in the storage.

The electronic device 101 determines whether to encrypt a block corresponding to a file based on an attribute of the file, and encrypts or does not encrypt the block corresponding to the file based on a determination result. In various embodiments of the present disclosure, the electronic device 101 determines whether to perform encryption based on at least one of a file path and a file name of a file, and encrypts or does not encrypt a block corresponding to the file based on a determination result.

In an embodiment, the electronic device 101 may or may not encrypt the block corresponding to the file based on at least one of a file path and a file name of the file, in initial booting or in response to a user's request. For example, the file system 480 may receive information about at least one of a file path and a file name corresponding to a file that is not to be encrypted, through IOCTL or system call. The file system 480 may or may not encrypt at least one block based on at least one of the received file path and file name. Herein, the file name may mean a binary that is executed runtime.

In an embodiment, the file system 480 may not encrypt a file corresponding to a particular path or a particular name among a plurality of files, and may encrypt the other files. In an embodiment, the file path or the file name may be an execution file path of a program installed or downloaded in the electronic device 101 or a name of the file.

Thus, the electronic device 101 according to various embodiments of the present disclosure may not encrypt a block corresponding to a file that does not need encryption, when encrypting the storage 540 including the plurality of files. Thus, the electronic device 101 according to various embodiments of the present disclosure may efficiently perform storage encryption and improve an application program execution speed of the electronic device 101.

The electronic device 101 according to various embodiments of the present disclosure may include an encryption module 1400 which may encrypt or decrypt a block. The encryption module 1400 may include software, hardware, firmware, or a combination thereof.

Figure 14:
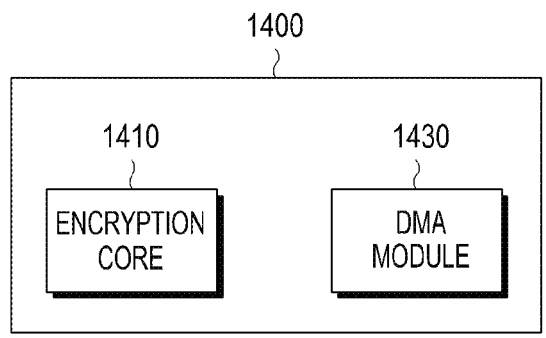
FIG. 14 is a block diagram of an encryption module according to various embodiments of the present disclosure.

FIG. 14 is a block diagram of an encryption module according to various embodiments of the present disclosure.

Referring to FIG. 14, the encryption module 1400 may include an encryption core 1410 and a DMA module 1430.

The encryption core 1410 performs overall operation related to data encryption or decryption. For example, the encryption core 1410 may encrypt or decrypt at least one block.

The DMA module 1430 transmits data between the memory 520 and the storage 540. The DMA module 1430 may correspond to the DMA module 530 of FIG. 5.

According to an embodiment, the encryption module 1400 may perform data encryption or decryption during data transmission using the DMA module 1430. In an embodiment, the encryption module 1400 may include flash memory protector hardware of Samsung Electronics Co., Ltd. According to an embodiment, when a flag for requesting encryption/decryption is set up in a block for which DMA transmission is requested, the encryption module 1400 may perform encryption or decryption of the block based on the set-up flag.

According to an embodiment, the encryption module 1400 may be included in an AP. For example, the encryption module 1400 may be included in a processor (for example, the processor 120 or 210). The encryption module 1400 may include at least one processor and a memory that stores firmware. According to an embodiment, the encryption module 1400 may be implemented by all processors or some of them and by the memory that stores firmware. The encryption module 1400 may mean an encryption circuit.

The electronic device 101 may perform the above-described selective encryption of a block by the block encryption module 790 through the encryption module 1400. Thus, the electronic device 101 may encrypt or decrypt the block for which DMA transmission is requested, during DMA transmission. For example, as described above, the electronic device 101 may encrypt a data block for a regular file among various file types through the encryption module 1400. As described above, the electronic device 101 may encrypt only a regular data block that is not a meta data block through the encryption module 1400. The electronic device 101 may selectively encrypt a block corresponding to a scanned file through the encryption module 1400 based on at least one of a type of the scanned file, an access authority corresponding to the scanned file, and a group to which the scanned file belongs, through the encryption module 1400. The electronic device 101 encrypts a block in which an encryption tag is tagged, through the encryption module 1400, and performs a bypass operation to cause the encryption module 1400 not to encrypt a block in which a non-encryption tag is tagged. When driving a file system utility, the electronic device 101 may cause the encryption module 1400 not to perform an encryption operation with respect to input or output corresponding to the file system utility.

The electronic device 101 provides an encryption execution menu through an application (for example, a setting application). The electronic device 101 encrypts a file (or data) stored in the electronic device 101 in response to a user input. According to an embodiment, the electronic device 101 may provide a menu corresponding to a scheme to encrypt all files stored in the electronic device 101 or a menu corresponding to a scheme to selectively encrypt some of the files through the display 160. The electronic device 101 may obtain a user input with respect to the scheme to encrypt all the files or the scheme to encrypt some of the files through the provided menu, and may perform the above-described encryption according to the obtained user input.

The foregoing description of the electronic device 101 is not limited to a particular operating system, and is applicable to various operating systems. Thus, a particular term of one operating system used in the foregoing description may mean another term corresponding to another operating system.

The description of the electronic device 101 is not limited to a particular file system, and is applicable to various file systems. Thus, a particular term of one file system used in the foregoing description may mean another term corresponding to another file system.

Each of the foregoing elements of the electronic device may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

As used herein, the term "module" may mean, for example, a unit including one of or a combination of two or more of hardware, software, and firmware. The "module" may be interchangeably used with other terms, for example, "logic," "logic block," "part," or "circuitry". The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with instructions stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. An electronic device comprising:
   a non-volatile storage;
   a volatile memory; and
   a processor electrically connected with the non-volatile storage and the volatile memory,
   wherein the non-volatile storage stores instructions for causing, when executed, the processor to:
      configure a block layer for virtualizing the non-volatile storage on the volatile memory;
      store at least one file in the configured block layer in a unit of a block;
      identify a first block corresponding to regular data of a regular file by scanning a file tree of the at least one file stored in the non-volatile storage;
      encrypt the first block without encrypting a second block corresponding to meta data of the regular file; and
      store at least one of the encrypted first block and the non-encrypted second block in the non-volatile storage.

2. The electronic device of claim 1, wherein the non-volatile storage stores the instructions for causing, when executed, the processor to encrypt the first block each time when the regular file is scanned.

3. The electronic device of claim 1, wherein the non-volatile storage stores the instructions for causing, when executed, the processor to encrypt the first block after completion of the scan.

4. The electronic device of claim 1, wherein the non-volatile storage stores the instructions for causing, when executed, the processor to scan the file tree of the at least one file stored in the non-volatile storage based on encryption switch for the non-volatile storage being input.

5. The electronic device of claim 1, wherein the non-volatile storage stores the instructions for causing, when executed, the processor to virtualize the non-volatile storage as a block device on the memory,
   a file system mounted on the memory determines whether to encrypt or decrypt data for which an input or output request is to be sent to the block device and delivers to the block device, information about whether to encrypt or decrypt the data, and
   the block device selectively encrypts or decrypts a block corresponding to the data based on the information about whether to encrypt or decrypt the data.

6. The electronic device of claim 5, wherein the non-volatile storage stores the instructions for causing, when executed, the processor to determine whether to encrypt or decrypt the data according to a type of a block of the data.

7. The electronic device of claim 6, wherein the non-volatile storage stores the instructions for causing, when executed, the processor to avoid encrypting the block of the data when the type of the block of the data is a meta data block.

8. The electronic device of claim 6, wherein the non-volatile storage stores the instructions for causing, when executed, the processor to include encryption and decryption information indicating whether to encrypt or decrypt the data in the input or output request, based on the determination of whether to encrypt or decrypt the data.

9. An electronic device comprising:
   a non-volatile storage;
   a volatile memory; and
   a processor electrically connected with the non-volatile storage and the volatile memory, wherein the non-volatile storage stores instructions for causing, when executed, the processor to:

virtualize the non-volatile storage as a block device on the volatile memory;

selectively encrypt at least one block corresponding to a file stored in the virtualized non-volatile storage; and bypass the at least one block to the virtualized non-volatile storage without encrypting the at least one block while checking an error of a file system.

10. An operation method of an electronic device comprising a non-volatile storage and a volatile memory, the operation method comprising:

configuring a block layer for virtualizing the non-volatile storage as a block device on the volatile memory;

storing at least one file in the configured block layer in a unit of a block;

identifying a first block corresponding to regular data of a regular file by scanning a file tree of the at least one file stored in the non-volatile storage;

encrypting the first block without encrypting a second block corresponding to meta data of the regular file; and storing at least one of the encrypted first block or the non-encrypted second block in the non-volatile storage.

11. The operation method of claim 10, wherein the encrypting of the first block comprises encrypting the first block each time when the regular file is scanned during a file tree scan operation or after completion of the file tree scan operation.

12. A non-transitory recording medium readable on an electronic device, the recording medium having stored therein a program for executing operations of:

configuring a block layer for virtualizing a storage functionally connected with the electronic device on a memory functionally connected with the electronic device;

storing at least one file in the configured block layer in a unit of a block;

identifying a first block corresponding to regular data of a regular file by scanning a file tree of the at least one file stored in the storage;

encrypting the first block without encrypting a second block corresponding to meta data of the regular file; and storing at least one of the encrypted first block and the non-encrypted second block in the storage.

* * * * *